United States Patent [19]

Mühlfeld et al.

[11] Patent Number: 5,541,277
[45] Date of Patent: Jul. 30, 1996

[54] THERMOPLASTIC POLYURETHANE MOLDING COMPOUND FOR MANUFACTURING GRAINED, SINTERED, PLASTIC SHEET

[75] Inventors: Horst Mühlfeld, Grasellenbach; Thomas Dabisch, Mörlenbach; Gerhard Müller-Broll, Fürth, all of Germany

[73] Assignee: Firma Carl Freudenberg, Weinheim, Germany

[21] Appl. No.: 14,957

[22] Filed: Feb. 8, 1993

[30] Foreign Application Priority Data

Feb. 6, 1992 [DE] Germany ................. 42 03 307.1

[51] Int. Cl.⁶ ............... C08G 18/42; C08G 18/44; C08G 18/61; C08J 5/18
[52] U.S. Cl. ............... 528/28; 528/83; 528/85; 264/331.19; 428/402; 150/154
[58] Field of Search ............... 528/28, 83, 85; 264/331.19; 428/402; 150/154

[56] References Cited

U.S. PATENT DOCUMENTS

| | | | |
|---|---|---|---|
| 3,509,233 | 4/1970 | Muller et al. | 528/83 |
| 3,541,183 | 11/1970 | Kallert et al. | 528/83 |
| 3,544,524 | 12/1970 | Müller et al. | 528/74 |
| 3,584,075 | 6/1971 | Bock et al. | 528/83 |
| 4,069,208 | 1/1978 | Hoeschele | 528/52 |
| 4,105,641 | 8/1978 | Buysch et al. | 528/85 |
| 4,600,653 | 7/1986 | Washita et al. | 428/425.6 |
| 4,722,946 | 2/1988 | Hostettler | 528/80 |
| 4,931,486 | 6/1990 | Myers | 528/83 |
| 5,218,058 | 6/1993 | Zeitler et al. | 525/453 |
| 5,252,683 | 10/1993 | Murata et al. | 528/85 |

FOREIGN PATENT DOCUMENTS

| | | |
|---|---|---|
| 1121770 | 7/1968 | United Kingdom . |
| 1435067 | 5/1976 | United Kingdom . |

*Primary Examiner*—James J. Seidleck
*Assistant Examiner*—Rabon Sergent
*Attorney, Agent, or Firm*—Kenyon & Kenyon

[57] ABSTRACT

A thermoplastic sinterable powder for manufacturing grained, sintered plastic sheet is described, which is comprised 100 party by weight of an exclusively linear, aliphatic polyol mixture composed of 60 to 80 parts by weight of polycarbonate diol, having an MW of 2000 and a hydroxyl value of 56 based on adipic acid, hexane diol and neopentyl glycol, having an MW of 2000 and a hydroxyl value of 56. Also included is 1,6-hexamethylene diisocyanate in an equivalence ratio of about 2.8:1.0 to 4.2:1.0, with respect to the total polyol, with the exception of 1,4-butane diol which is added as a chain lengthener. The coefficient of the molding compound, calculated from the quotient of the equivalence ratios of the isocyanate groups multiplied by 100 and the sum of the hydroxyl groups of polyols and chain lengtheners is in the range of about 97 to 99.

14 Claims, No Drawings

THERMOPLASTIC POLYURETHANE MOLDING COMPOUND FOR MANUFACTURING GRAINED, SINTERED, PLASTIC SHEET

FIELD OF THE INVENTION

This invention relates to a thermoplastic polyurethane molding compound particularly suitable for use in Sinter-Powder-Methods for making plastic sheet, in particular, grained, sintered, plastic sheet used as a surface covering, e.g., soft trim for motor vehicle dashboards.

BACKGROUND OF THE INVENTION

In the past, the sheeting used as surface covering for dashboards in motor vehicles has been manufactured from polyvinyl chloride. The chlorine content and heavy metal components included in such polyvinyl chloride molding compounds have caused recycling problems. In automotive applications 'fogging', that is outgassing of plasticizer or softening agents is known to occur when such sheeting is exposed to solar radiation. The outgassed material may collect and become noticeable as a troublesome film on the inside of a vehicle's windshield.

Commercially available thermoplastic polyurethanes, used in the manufacture of artificial leather and in extrusion and injection molding processes, are in fact suitable for thermoplastic processing in Sinter-Powder-Methods; however, they do not completely fulfill the requirements of the automotive industry for dashboard soft trim, particularly with respect to light and temperature stability.

Aromatic diisocyanate components in aromatic thermoplastic polyurethanes are not light-resistant and can, upon exposure to light, cause considerable yellowing in lighter shade materials and even a change in color intensity and luster in black materials.

While aliphatic thermoplastic polyurethanes may be light-resistant, their temperature stability may not be sufficient for motor vehicle dashboard applications. The interior space behind the windshield in a motor vehicle can heat up to over 100° C. when exposed to strong solar rays. Such high temperatures are above the softening point of typical aliphatic thermoplastic polyurethanes. Accordingly, grain stability (grain crack resistance) up to a temperature of 130° C. and hot-light stability up to 120° C. may not be attainable with a conventional aliphatic thermoplastic polyurethanes.

OBJECTS AND SUMMARY OF THE INVENTION

An object of the present invention is to provide a thermoplastic polyurethane molding compound, that can be processed as a sinterable power and which exhibits advantageous combinations of the following properties:

soft and leather-like feel;

light fastness, i.e., minimal or no yellowing nor change in luster intensity upon exposure to light;

grain stability at temperatures up to 130° C. and hot-light stability at temperatures up to 120° C.;

softening temperatures above 140° C.;

sharp melting points;

a low-viscosity molten mass, at the melting point; high tensile strength, initial tear resistance and resistance to further tearing;

negligible "fogging"; i.e., outgassing of softening agents or plasticizer;

good adherence to the polyurethane foam backing materials such as an automotive instrument panel body; and easy removal of sintered skin made with the compound from a mold without a release agent.

The foregoing objects result from both dashboard manufacture requirements and motor-vehicle operating conditions.

It is another object of this invention to provide a method for making molded thermoplastic polyurethane articles, preferably sheet materials, utilizing a molding compound that rapidly sinters and crystallizes under ordinary molding conditions and that economically produces sintered sheet articles substantially free of bubbles and pin holes, having a durable grain, and good properties for automotive applications, such as hot-light stability and thermal characteristics.

SUMMARY OF THE INVENTION

The present invention provides a polyurethane molding compound, that can be processed thermoplastically in the form of sinterable powder and that is suitable for manufacturing grained, sintered, sheeting useful as a surface covering for dashboards, comprising a mixture of i) 100 parts by weight of a polyol mixture of exclusively linear, aliphatic components including 60 to 80 parts by weight of polycarbonate diol, MW 2000 (Molecular Weight), hydroxyl value 56 and 20 to 40 parts by weight of polyester diol based on adipic acid, hexane diol and neopentyl glycol, MW 2000, hydroxyl value 56; ii) 1,6-hexamethylene diisocyanate in an equivalence ratio of 2.8:1.0 to 4.2:1.0, in relation to the total polyol, except 1,4-butane diol; iii) 1,4-butane diol as a chain lengthener in an equivalence ratio of 1.8:1.0 to 3.3:1.0, with respect to the total polyol; and, wherein the coefficient, calculated from the quotients of the equivalence ratios of the isocyanate groups multiplied by 100 and the sum of the hydroxyl groups of polyols and chain lengtheners is about 97 to 99. Preferably, the foregoing molding compound further includes 0.5 to 5 parts by weight, in relation to 100 parts of total polyol, of dimethyl polysiloxane having terminal hydroxyl groups and an MW of 2200. The invention also provides a method for using the molding compounds to make useful articles such as dashboard skins.

DETAILED DESCRIPTION OF THE INVENTION

The molding compound of this invention in its powder form can be sintered in open, heatable molds to form skins according to the known "Sinter-Powder-Method". The resultant skins can be easily removed from the molds after cooling. These methods are analogous to the method for manufacturing dashboard coverings with PVC skins described, for example, in DE-A 39 32 923 as the "Powder-Slush-Method" wherein: a thermoplastic PVC molding compound powder is obtained from a granular material by cold milling; the powder is introduced through an opening on one side into a heatable mold; then the mold is heated so that the powder sinters on its inside wall surface within a short period of time; and after cooling the sintered powder is removed from the mold as skin.

According to the invention, the combination of polyols in a "soft segment" of the molding compound favorably influences the melting viscosity and melting progression during the sintering process, making a rapid sintering possible, so that a homogeneous sheeting which is substantially free of pin holes and bubbles is formed.

The composition of the "hard segment", 1,6-hexamethylene diisocyanate and 1,4-butane diol, as well as, the combination of polyols in the "soft segment" provide a rapidly crystallizing compound. This propensity to crystallize is also a substantial factor in achieving good processability using the Powder-Slush-Method and for attaining an excellent thermal characteristics for automotive applications.

A thermoplastic polyurethane molding compound of the following composition exhibits the properties as set forth above that are desirable for automotive dashboard applications: a mixture of exclusively linear, aliphatic polyols comprised of 60 to 80% by weight of polycarbonate diol having a hydroxyl value of 56 and MW of 2000; 20 to 40% by weight of adipic acid-hexane-diol-neopentylglycol polyester having a hydroxyl value of 56 and MW of 2000. In addition to the mixture of linear polyols, the polyurethane molding compound also contains 1,6-hexamethylene diisocyanate and as a chain lengthener 1,4-butane diol. The polyols, with the exception of the 1,4-butane diol, and the 1,6-hexamethylene diisocyanate, are present in the reaction mixture with an equivalence ratio to one another of 1:2.8 to 1:4.2. The butane diol is specified with an equivalence ratio of 1.8:1 to 3.3:1, with respect to the total polyol.

The coefficient (value), calculated from the quotient of the equivalence ratios of the isocyanate groups multiplied by 100 and the sum of the hydroxyl groups of polyols and chain lengtheners, lies at 97 to 99.

A sintered sheet produced from this compound has a high tensile strength, as well as excellent initial tearing resistance and resistance to further tearing. It also has a soft and leather-like feel and, even when it has a light coloring, it does not tend to yellow or to undergo a change in luster intensity when exposed to sunlight.

The appearance of the grain does not change when it is subjected to hot-light ageing (110°–120° C.); there is likewise no change when it is subjected to heat-ageing as the result of being stored on a grating.

This sheeting adheres exceptionally well to the polyurethane backing foam typically found in automotive instrument panels.

Due to the sharp melting point at 180° C. and the presence of a low-viscosity molten mass at the melting point, the powders produced with this compound sinter on the inner wall of a heated mold quickly and form a homogeneous sheeting which is substantially free of pin holes and bubbles. Because the molding compound according to the invention has a considerable propensity to crystallize, the sheeting can be quickly and easily removed from the mold after it has cooled to about 100° C.

In a preferred embodiment, 0.5 to 5 parts by weight, per 100 parts of total polyol, of dimethyl polysiloxane having terminal hydroxyl groups and an MW of 2200 is added to the polyol mixture. By incorporating dimethyl polysiloxane in the "soft segment" of the compound, it is possible to remove a sintered skin from a mold without using a release agent. The polysiloxane functions in the sintered polyurethane, not only as an internal lubricating agent and mobile solvent, but when completely incorporated in the molecular chain, it also has the effect of an internal release agent.

Another significant advantage of incorporating the polysiloxane into the molding compound of this invention is that a leather-like, "not-too-dry" feel on the skin surface is achieved as a result of the terminal hydroxyl groups. This property, which cannot easily be quantified, is nevertheless a significant quality attribute that is not characteristic of a crystallized and plastic-type polyurethane.

The polyurethane molding compounds of this invention need not contain any plasticizer or softening agents whatsoever. They may contain generally known additives in conventional amounts, such as agents for protecting against light and/or ageing, without losing their advantageous properties.

The following Examples will further clarify the invention.

EXAMPLE 1

Composition of the mixture:

70.00 parts by weight of polycarbonate diol having an MW of 2000

30.00 parts by weight of polyester diol based on adipic acid, hexane diol and neopentyl glycol, MW 2000

30.00 parts by weight of 1,6-hexamethylene diisocyanate 11.88 parts by weight of 1,4-butane diol Method of preparation:

The molding compound of this invention may be prepared in a one-step process. The polyol mixture, 1,4-butane diol and diisocyanate are heated to 80° C. in a reaction vessel while being stirred. An exothermic reaction then causes the temperature to rise to 190° C. in about 10 minutes At this temperature, the mixture is poured on to a polytetrafluoroethylene foil to form a plate. After about eight hours, the plate can be granulated and, while being cooled by liquid nitrogen, subsequently ground into a fine powder having a particle-size distribution of about 50 to 400 μm (micrometers).

This polyurethane molding compound has the following melting properties:

Melting point: 180° C.

Melt (flow) index according to DIN 53 735 under a 2.16 kg load, measured at 200° C.: 53 g/10 min measured at 210° C.: 82 g/10 min measured at 220° C.: 123 g/10 min measured at 230° C.: 215 g/10 min.

A sheet produced using the Powder-Slush-Method has the following properties:

Tensile strength: 26N/mm$^2$

Elongation at break: 480%

Resistance to further tearing: 102N/mm.

Fogging behavior, tested according to DIN 75 201, reflectometer value after 3 h/100° C.: 95% residual luster.

Condensable components after 16 h/100° C.: 0.50 mg/50 cm$^2$.

Fastness to light under xenon arc light (DIN 75 202): step 8 according to the blue scale.

Temperature stability, heat storage 500 h/130° C. on a grating: no change in the appearance of the grain.

EXAMPLE 2

Composition of the mixture:

70.00 parts by weight of polycarbonate diol, MW 2000

27.00 parts by weight of polyester diol based on adipic acid, hexane diol and neopentyl glycol, MW 2000

3.00 parts by weight of dimethyl polysiloxane, MW 2200

30.00 parts by weight of 1,6-hexamethylene diisocyanate 11.91 parts by weight of 1,4-butane diol The preparation takes place in accordance with Example 1. The polyurethane molding compound has the following melting properties:

Melting point: 175° C.

Melt (flow) index according to DIN 53 735 under a 2.16 kg load, measured at 200° C.: 73 g/10 min measured at 210° C.: 91 g/10 min measured at 220° C.: 158 g/10 min measured at 230° C.: 237 g/10 min.

A sheeting produced using the Powder-Slush-Method has the following properties:

Tensile strength: 20N/mm$^2$

Elongation at break: 465%

Resistance to further tearing: 76N/mm.

Fogging behavior, tests according to DIN 75 201, reflectometer value after 3 h/100° C.: 96% residual luster.

Condensable components 0.61 mg/50 cm$^2$. after 16 h/100° C.: 0.61 mg/50 cm$^2$.

Fastness to light according to (DIN 75 202): step 8 according to the blue scale.

Temperature stability, heat storage, 500 h/130° C. on a grating: no change in the appearance of the grain.

We claim:

1. A sinterable, non-crosslinked polyurethane molding compound powder for making grained, sintered plastic sheet consisting essentially of:

100 parts by weight of a polyol mixture of exclusively linear, aliphatic, hydroxy-terminated diols, including at least 60 parts by weight of polycarbonate diol, molecular weight 2000, hydroxyl value 56, 20 to 40 parts by weight of polyester diol based on adipic acid, hexane diol and neopentyl glycol, molecular weight 2000, hydroxyl value 56, and 0.5 to 5 parts by weight of dimethyl polysiloxane having terminal hydroxyl groups and a molecular weight of 2200;

1,6-hexamethylene diisocyanate in an equivalence ratio of 2.8:1.0 to 4.2:1.0, in relation to the total polyol except 1,4-butane diol;

1,4-butane diol as a chain lengthener in an equivalence ratio of 1.8:1.0 to 3.3:1.0, with respect to the total polyol; and the compound having a coefficient calculated from the quotients of the equivalence ratios of the isocyanate groups multiplied by 100 and the sum of the hydroxyl groups of polyols and chain lengtheners of about 97 to 99.

2. The polyurethane molding compound according to claim 1, wherein the compound is in a powder form having a particle size in the range of 50 to 400 micrometers.

3. The polyurethane molding compound according to claim 1, consisting essentially of:

70.00 parts by weight of polycarbonate diol, MW 2000;

27.00 parts by weight of polyester diol based on adipic acid, hexane diol and neopentyl glycol, MW 2000;

3.00 parts by weight of dimethyl polysiloxane, MW 2200;

30.00 parts by weight of 1,6-hexamethylene diisocyanate; and 11.91 parts by weight of 1,4-butane diol.

4. A dashboard covering composed of the polyurethane molding compound according to claim 3.

5. The dashboard covering according to claim 4 having a grained finish.

6. A dashboard covering composed of the polyurethane molding compound according to claim 1.

7. The dashboard covering according to claim 6 having a grained finish.

8. A method for preparing a surface covering, comprising the steps of:

preparing a sinterable powder from a non-crosslinked polyurethane molding compound consisting essentially of 100 parts by weight of a polyol mixture of exclusively linear, aliphatic, hydroxy-terminated diols, including at least 60 parts by weight of polycarbonate diol, molecular weight 2000, hydroxyl value 56, 20 to 40 parts by weight of polyester diol based on adipic acid, hexane diol and neopentyl glycol, molecular weight 2000, hydroxyl value 56, and 0.5 to 5 parts by weight of dimethyl polysiloxane having terminal hydroxyl groups and a molecular weight of 2200;

1,6-hexamethylene diisocyanate in an equivalence ratio of 2.8:1.0 to 4.2:1.0, in relation to the total polyol except 1,4-butane diol;

1,4-butane diol as a chain lengthener in an equivalence ratio of 1.8:1.0 to 3.3:1.0, with respect to the total polyol;

the compound having a coefficient calculated from the quotients of the equivalence ratios of the isocyanate groups multiplied by 100 and the sum of the hydroxyl groups of polyols and chain lengtheners of about 97 to 99;

introducing the powder to a mold having a molding surface;

heating and sintering the powder on the molding surface to form skin;

cooling the mold; and removing the skin from the mold.

9. The method according to claim 8, wherein the powder has a particle size in the range of 50 to 400 micrometers.

10. The method according to claim 8 wherein the polyurethane molding compound consists essentially of:

70.00 parts by weight of polycarbonate diol, MW 2000;

27.00 parts by weight of polyester diol based on adipic acid;

hexane diol and neopentyl glycol, MW 2000;

3.00 parts by weight of dimethyl polysiloxane, MW 2200;

30.00 parts by weight of 1,6-hexamethylene diisocyanate; and 11.91 parts by weight of 1,4-butane diol.

11. A dashboard covering made in accordance with the method of claim 10.

12. The dashboard covering according to claim 11 having a grained finish.

13. A dashboard covering made in accordance with the method of claim 8.

14. The dashboard covering according to claim 13 having a grained finish.

* * * * *